United States Patent [19]
An et al.

[11] Patent Number: 5,964,440
[45] Date of Patent: Oct. 12, 1999

[54] CAM ACTUATED, ADJUSTABLE CLAMP

[75] Inventors: Bin An, Woodinville; Paul Hornikx, Redmond; Dan Blase, Everett, all of Wash.

[73] Assignee: Microsoft Corporation, Redmond, Wash.

[21] Appl. No.: 09/106,201

[22] Filed: Jun. 26, 1998

[51] Int. Cl.⁶ .................................................. A47G 1/10
[52] U.S. Cl. ........................ 248/316.2; 24/522; 24/535; 248/229.11
[58] Field of Search .............................. 248/316.2, 316.1, 248/316.5, 316.8, 229.11, 229.13, 229.15, 229.21, 229.23, 229.25, 228.2, 228.4, 228.6; 24/535, 536, 522, 569

[56] References Cited

U.S. PATENT DOCUMENTS 1,227,738  5/1917  Bellis et al. .................... 248/229.15 X
2,682,694  7/1954  Kempkes ................................. 24/569
5,848,783  12/1998  Weissenborn .............................. 269/97

*Primary Examiner*—Ramon O. Ramirez
*Attorney, Agent, or Firm*—Ronald M. Anderson

[57] ABSTRACT

Apparatus for clamping a device to a work surface. A cam actuated, adjustable clamp provides a connection between the device and the work surface. The clamp includes a handle and a lever pivotally coupled to a housing member; a hand rotated threaded bolt in the end of the lever is used to adjust the position of a shoe to accommodate work surfaces of different thicknesses. The handle and lever pivot about bearings on two rods. Connectors extend between the two rods and they are coupled to the housing member. Cams on the handle ride on a surface of the lever as the handle is moved, applying a force to the lever that controls its position relative the underside of the work surface. The clamp is engaged/disengaged by a single movement (approximately 90 degrees of rotation) of the handle. A spring or linkage may be provided to bias the lever away from the work surface when the clamp is in the open (disengaged) position.

26 Claims, 15 Drawing Sheets

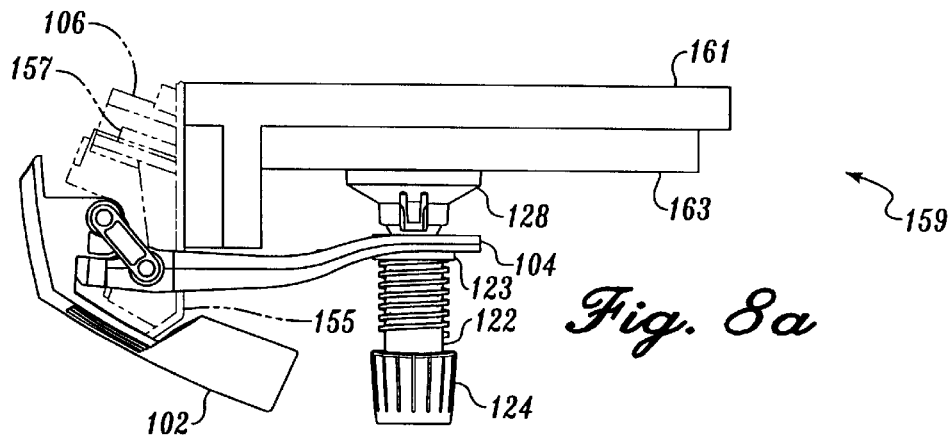
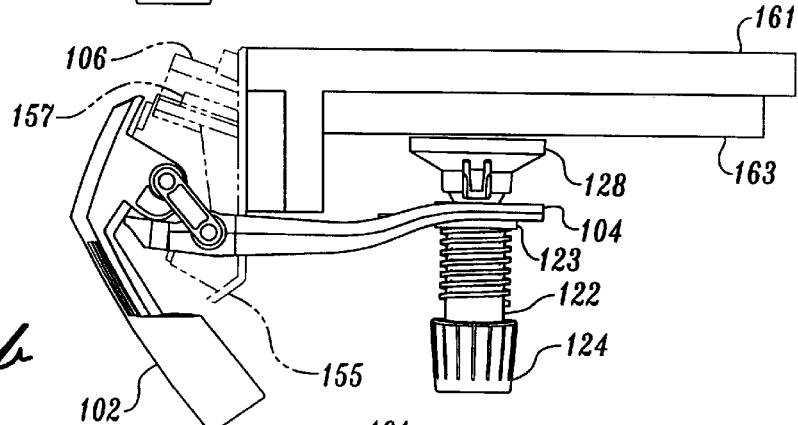
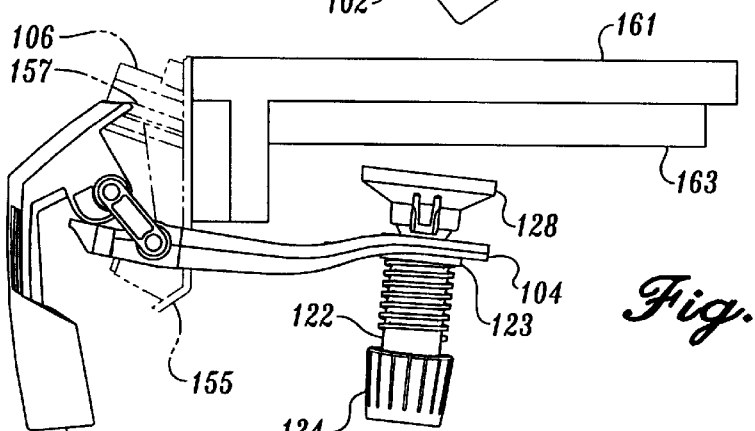
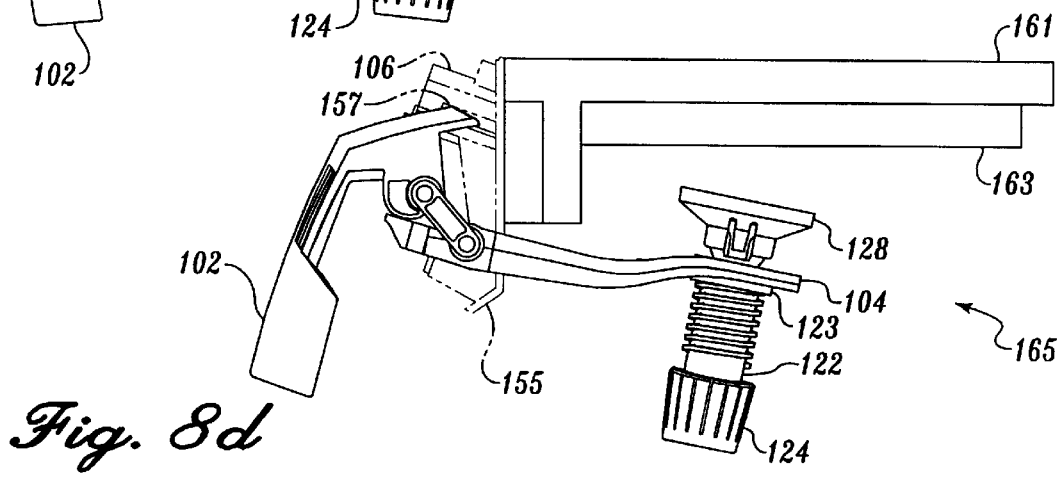

CAM ACTUATED, ADJUSTABLE CLAMP

FIELD OF THE INVENTION

The present invention generally pertains to a clamp for clamping a device to a work surface, and more specifically, to a clamp that enables a device to easily be attached to and de-attached from a work surface by rotating a handle that actuates a clamp.

BACKGROUND OF THE INVENTION

Clamps for attaching devices to work surfaces such as desks and table tops are often used in the work place and at home. For example, a clamp having a threaded bolt has been used for connecting the base of an articulated lighting fixture to a desk. The bolt passes through a plate that is threaded through an orifice in the top side of the base; when the bolt is tightened, it applies force on each surface of the desk, holding the lighting fixture to the desk. A user may thus secure the fixture to a particular position on the desk to illuminate a desired portion of the desk. Also, the threaded bolt is sufficiently long to enable the user to clamp the fixture to different work surfaces having a fairly wide range of thicknesses.

There are several drawbacks to using a clamp with a threaded bolt to connect a device to a work surface. First, the threaded bolt is typically located under the work surface in a position that is not readily visible. Second, unless the user is relatively strong, a tool may be required to properly tighten the bolt. Sometimes, a "T-shaped" handle is provided on the head of the bolt, but the handle can interfere with leg movement under the desk or work surface. Moreover, since it is relatively inconvenient for the user to connect/disconnect the clamp to the work surface, the user is less likely to reposition the device on a regular basis, even though it might otherwise be desirable to do so.

The computer game industry has developed various types of clamps to hold input devices, such as steering wheel assemblies, in place on work surfaces. Clamps are desirable to stabilize the input devices so that they do not move when subjected to vigorous game play. However, none of the previously available clamps has provided a strong and stable connection, a low engagement effort, a low cost, complete release from the work surface when disengaged, and a simple adjustment that accommodates a substantial range of thicknesses and non-planar work surfaces. Thus, there is a need for a simple, low cost, adjustable clamp that provides these features.

SUMMARY OF THE INVENTION

In accord with the present invention, apparatus are defined for clamping a device to a work surface, at an edge. The apparatus are disposed generally at the edge and adjacent one side of the work surface, and the device is disposed generally at the edge and in contact with an opposite side of the work surface. The apparatus include an elongate handle having two opposite ends. A cam is disposed adjacent to one end of the handle; the other end of the handle includes a grip. The handle is pivotally coupled to a member that is attached to the device. The invention also includes an elongate lever having two opposed ends. A surface disposed adjacent one end of the lever rides on the cam of the handle. A socket is disposed at the other end of the lever, which is also pivotally coupled to the member. Rotation of the handle by a user causes the cam to apply a force on the surface of the lever that produces a corresponding rotation of the lever. A bolt is disposed in the socket and is adjustable relative to the lever to accommodate a thickness of the work surface. As the handle is pivoted to a closed position, a shoe coupled to an end of the bolt applies a compressive force against the one side of the work surface, relative to the device that is in contact with the opposite side of the work surface. The shoe moves away from the one side of the work surface as the handle is pivoted to an open position. When the handle is moved to the closed position, the device is clamped to the work surface, and when the handle is moved to the open position, the device can readily be removed from the work surface.

The bolt is threaded and the socket has a corresponding mating thread. Accordingly, the disposition of the bolt within the socket is adjusted to accommodate the thickness of the work surface by rotating the bolt within the socket. Furthermore, the bolt extends through the socket in a direction that is tilted slightly toward the front of the clamp (i.e., toward the user) when the device is not secured to the work surface. The end of the bolt has a generally spherical shape that clips within a correspondingly sized and shaped cavity formed within the shoe; this spherical shape enables the shoe to universally rotate relative to the end of the bolt so that the shoe is able to seat against the one side of the work surface even when that side is substantially non-parallel to the opposite side of the work surface. An end of the bolt opposite that coupled to the socket includes a knob having a surface that is adapted for gripping by the user.

The lever is preferably fabricated of a material having a characteristic flexibility that enables the lever to flex without breakage when the bolt has not been correctly adjusted to the thickness of the work surface. A width of the one end of the lever is broader than a width of the other end of the lever to disperse force where the lever is pivotally mounted to the member.

In a preferred form of the invention, the handle includes another cam; the cams are disposed near opposing edges on the same side of the handle. The other cam also rides on the surface of the lever as the handle is moved by the user. The cam is either disposed above the end of the lever or below the end of the lever.

The handle is pivotally mounted to the member by a first rod. Similarly, the lever is pivotally mounted to the member by a second rod. A strap extends between the first rod and the second rod to sustain forces between the rods arising as the handle and lever move, so that these forces are generally not experienced by the member.

Bearings are preferably disposed about the first and second rods to reduce friction between the handle and the first rod and between the lever and the second rod as the handle and the lever pivot about the first and second rods, respectively. In one preferred form of the invention, the bearings are formed of a non-metallic material, and these bearings may comprise bushings.

Also included is a stop that limits travel of the handle in either the closed position and the open position.

The member may be integral to the device, or alternatively, the invention may include a fastener to removably attach the device to the member. This fastener preferably comprises a slot formed in either the member or the device, and a pin coupled to the other of the member and the device and positioned to engage the slot. The device is removably attached to the member by engaging the pin in the slot.

A torsion spring may be used to apply a force to the lever, causing the other end of the lever to be moved away from the one side of the work surface as the handle is moved to the open position. Alternatively, the apparatus may include a helical spring coupled between the member and the lever, to apply a force to the lever that causes the other end of the lever to be moved away from the one side of the work surface as the handle is moved to the open position. As a still further alternative, a link may be included for loosely connecting the handle to the lever; the link causes the other end of the lever to be moved away from the one side of the work surface as the handle is moved to the open position.

The open position is defined by the handle being generally vertically oriented, and the closed position is defined by the handle being generally horizontally oriented. The grip on the handle preferably has a shape that is contoured and adapted to be grasped by a hand of the user. It is contemplated that the device will be either a joystick, a steering wheel, a yoke, a lamp, a computer monitor, a microphone, a telephone, a fan, or an audio speaker, although still other types of devices may be clamped to the work surface with the present invention.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIGS. 8a–8d are side elevational views showing the clamp moving from a closed (engaged) position to an open (disengaged) position;

DESCRIPTION OF THE PREFERRED EMBODIMENT

Figure 1:
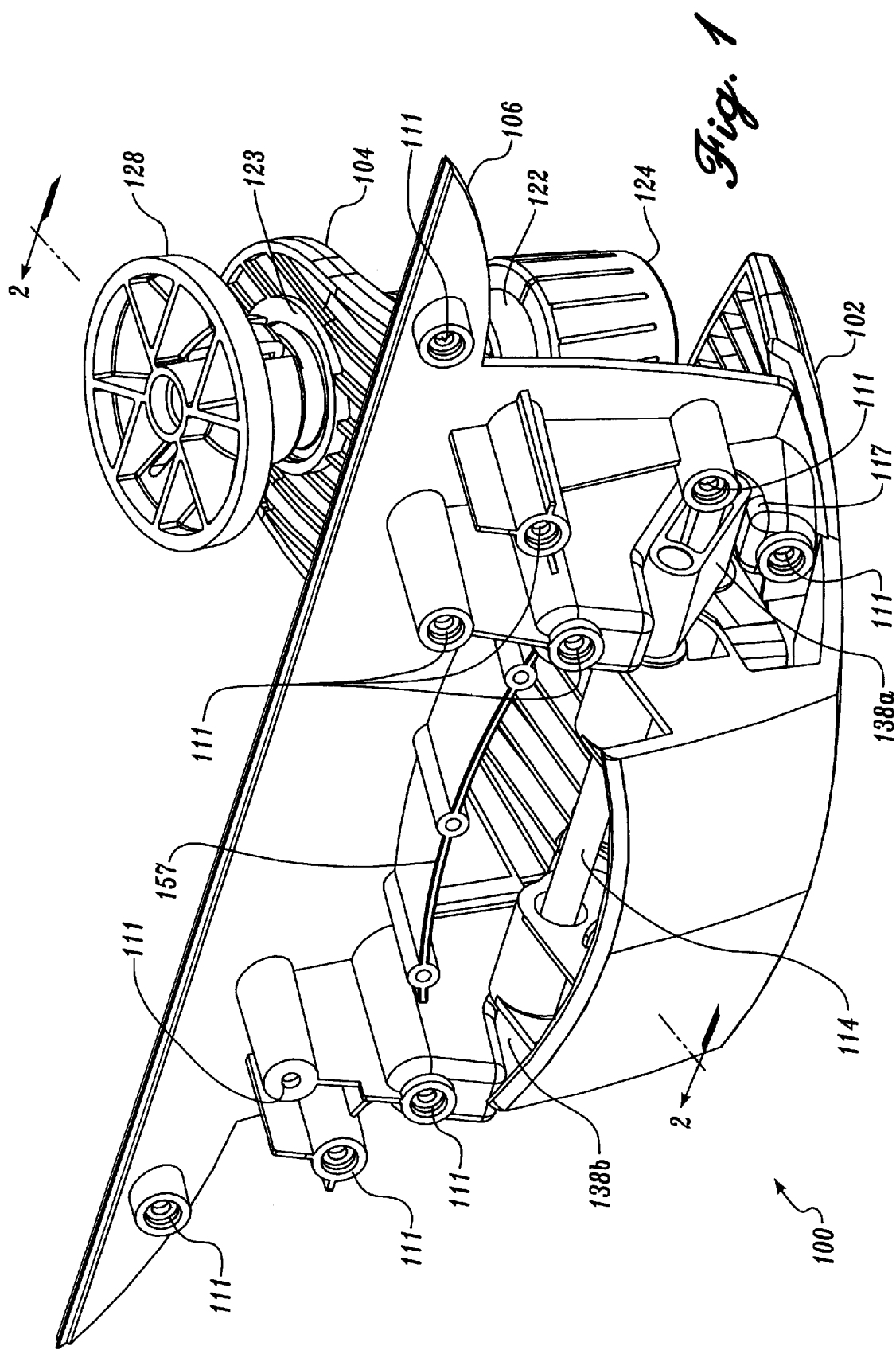
FIG. 1 is an isometric top view of a clamp assembly in accord with a preferred embodiment of the present invention, showing a portion of a device with which the clamp assembly is used.
Figure 2:
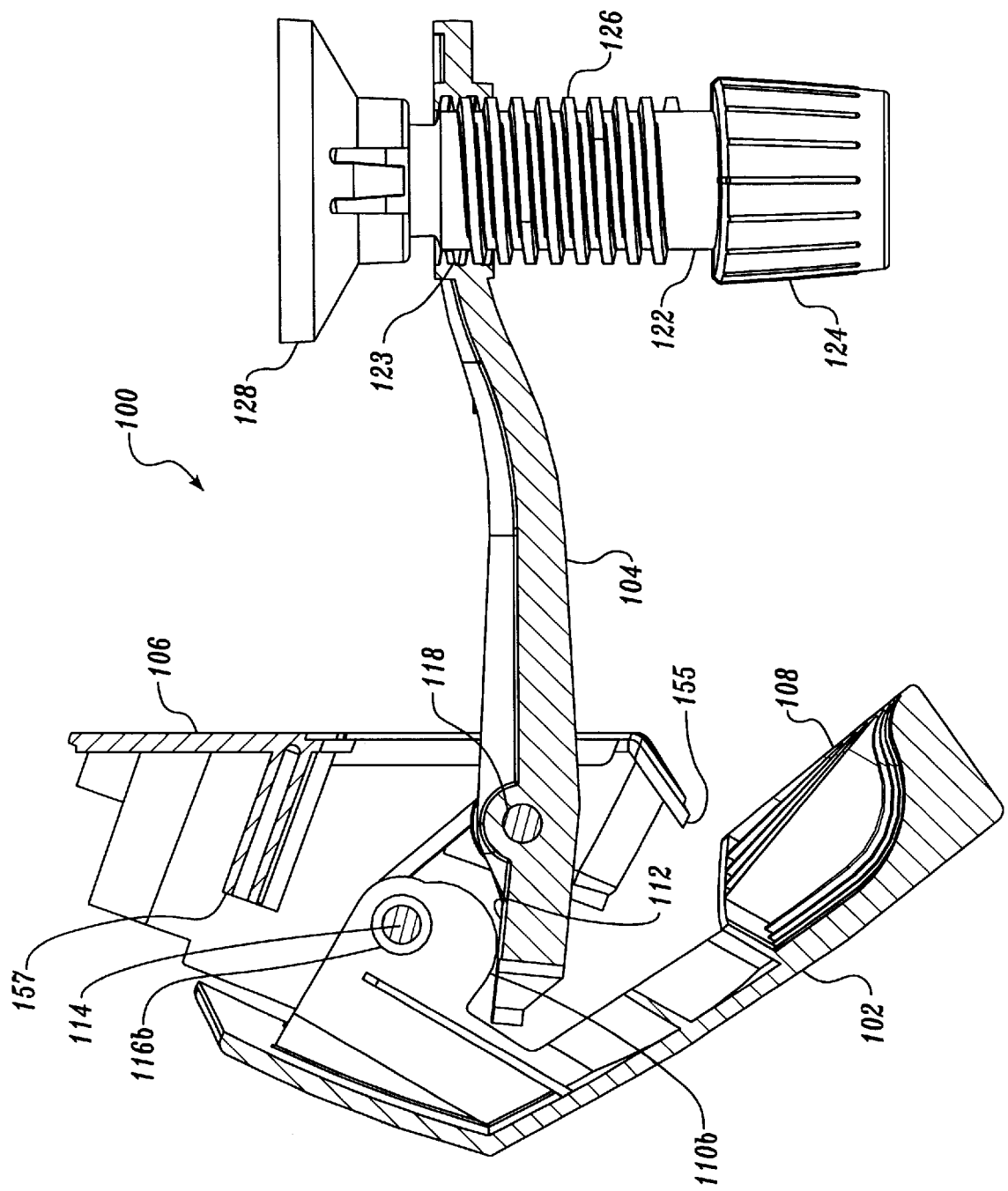
FIG. 2 is a cross-sectional view taken along section line 2—2 in FIG. 1, illustrating a handle, a lever, and an adjustable member of the clamp.

With reference to FIG. 1, a clamp 100 is shown in a closed (engaged) position. Further details of the clamp, in a partially open (disengaged) position are shown in FIG. 2. Clamp 100 includes a handle 102 that is pivotally mounted on a rod 114 coupled to a housing member 106, so that the handle can rotate about the rod. Similarly, a lever 104 is pivotally mounted and coupled to housing member 106 to rotate about a rod 118. Rod 118 (shown in FIG. 2) is disposed a short distance from one end of the lever. A connector 138a is connected from an end of rod 114 to an end of rod 118 and another connector 138b (shown in FIG. 4) is coupled between the other ends of rods 114 and 118. Connector 138a is supported by a notch 117a that is formed in housing member 106, and connector 138b is similarly supported by another notch 117b (not shown) formed in an opposite side of the housing member. A plurality of sockets 111 are spaced apart over housing member 106. Each socket 111 is threaded to match the threads of bolts (not shown) used to connect the device to housing member 106. Also, the connection of the device to housing member 106 loosely secures connectors 138a and 138b in notches 117a and 117b, respectively. It is important to note that the present invention enables substantially the same lever and handle to be employed in a clamp for use with any one of a plurality of different housing members that are separately configured for connection to different devices, so long as each different housing member includes notches 117a and 117b to support connectors 138a and 138b, respectively.

Disposed adjacent another end of lever 104 is a socket 123 in which a bolt 122 is threaded. At a lower end of bolt 122 is disposed a knurled knob 124. Socket 123 is threaded to receive threads 126 of bolt 122, and knob 124 is rotated to position bolt 122 at a desired position within socket 123, i.e., to move bolt 122 into or out of socket 123. While not evident in the Figures, socket 123 is formed so that an upper end of bolt 122 is tilted a few degrees toward the front of the clamp (i.e., towards the user) when the clamp is open and lever 104 is not under stress. A shoe 128 is coupled to the upper end of the bolt, mounted so that it has freedom to pivot relative to the end of the bolt.

In its fully open (disengaged) position, handle 102 moves past vertical. However, as shown in FIG. 2, the handle is about midway between its fully open and closed positions. The lower end of handle 102 includes a surface 108 that is contoured to enable a user to easily grip the handle. An end of rod 114 and a bearing 116b that is seated within the handle form one side of a pivot assembly that connects handle 102 to housing member 106. Immediately below the point where handle 102 is pivotally mounted on bearing 116b to rod 114, the handle includes a cam 110b that rides against a surface 112 on the end of lever 104. The profile of cam 110b is shaped so that as handle 102 is rotated to the vertical position, the distance between cam 110b and a center of rod 118 decreases. A similarly shaped cam 110a (visible in FIG. 5) is disposed on the other side of handle 102 and also rides against surface 112 of lever 104. Rotation of handle 102 about rod 118 thus applies a varying clamping force to lever 104, as a function of the corresponding points along the profile of cams 110a and 110b that is in contact with surface 112. When the handle is in its fully closed position, and bolt 122 is properly adjusted relative to the thickness of the work surface, lever 104 will deflect so that bolt 122 will be generally vertical. The slight tilt of bolt 122 towards the user when lever 104 is not under stress ensures that the bold will be perpendicular to the work surface when the lever is securing a device to the work surface. A stop 157 projecting outwardly from housing member 106 limits the rotation of handle 102 in the clockwise direction (i.e., determines the fully opened position of the handle) and a stop 155 formed along a lower edge of the housing member limits the rotation of the handle in the counter clockwise direction (i.e., determines its fully closed position).

Figure 3:
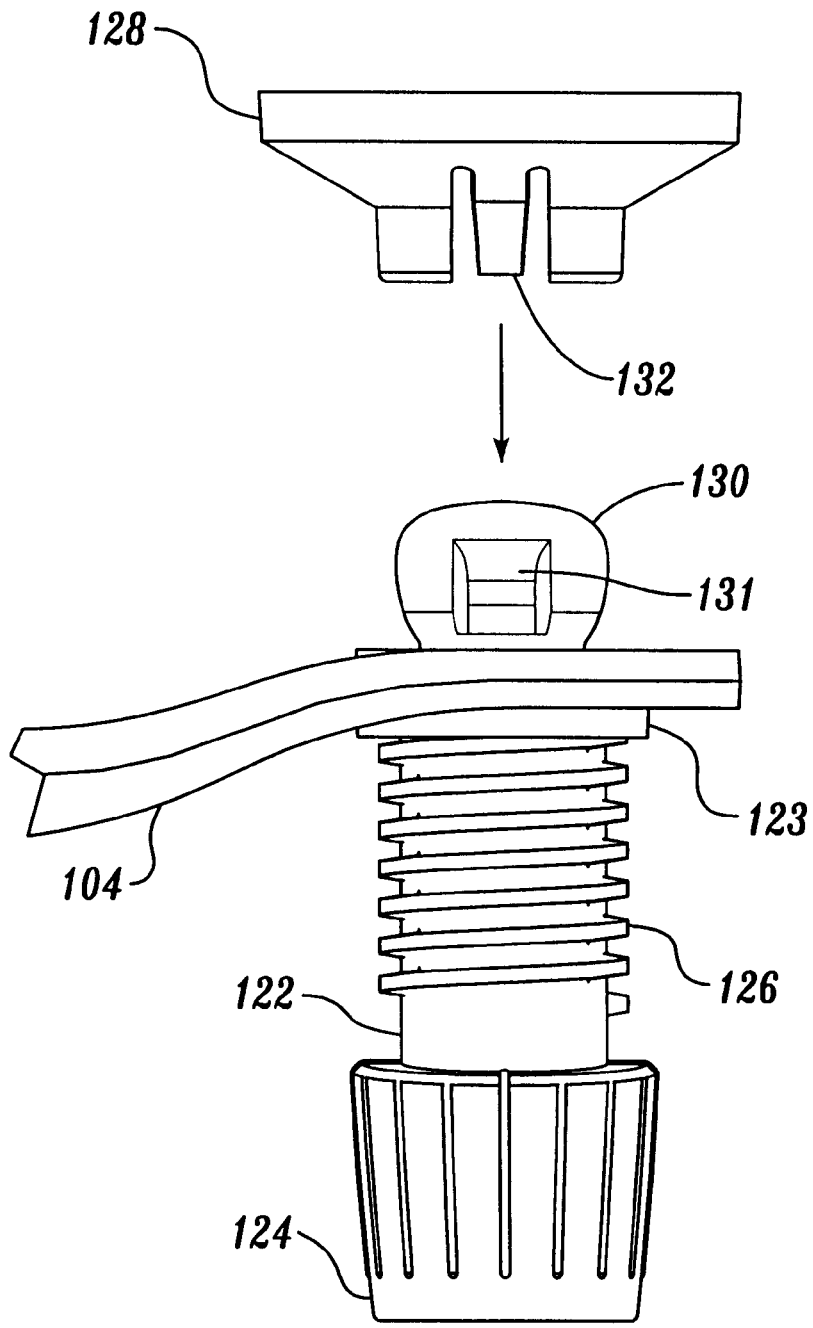
FIG. 3 is an exploded side view of an end of the lever illustrated in FIG. 2.

As shown in FIG. 3, shoe 128 is connected to a spherically shaped ball 130 formed on the end of bolt 122. Shoe 128 receives ball 130 in a correspondingly ball-shaped cavity 121 formed in its underside. A tab 132 extends down from shoe 128 on one side of this cavity and grips a slot 131 formed around the base of ball 130, and the slot is sized so that shoe 128 may universally rotate and pivot about ball 130. The universal rotation and pivoting of shoe 128 accommodates non-planar work surfaces by enabling the shoe to move into alignment with the work surface when lever 104 is rotated to the closed position. Also, knob 124 is knurled to improve the grip of the user's hand on the knob when bolt 122 is adjusted (threaded) into or out of socket 123.

Figure 5:
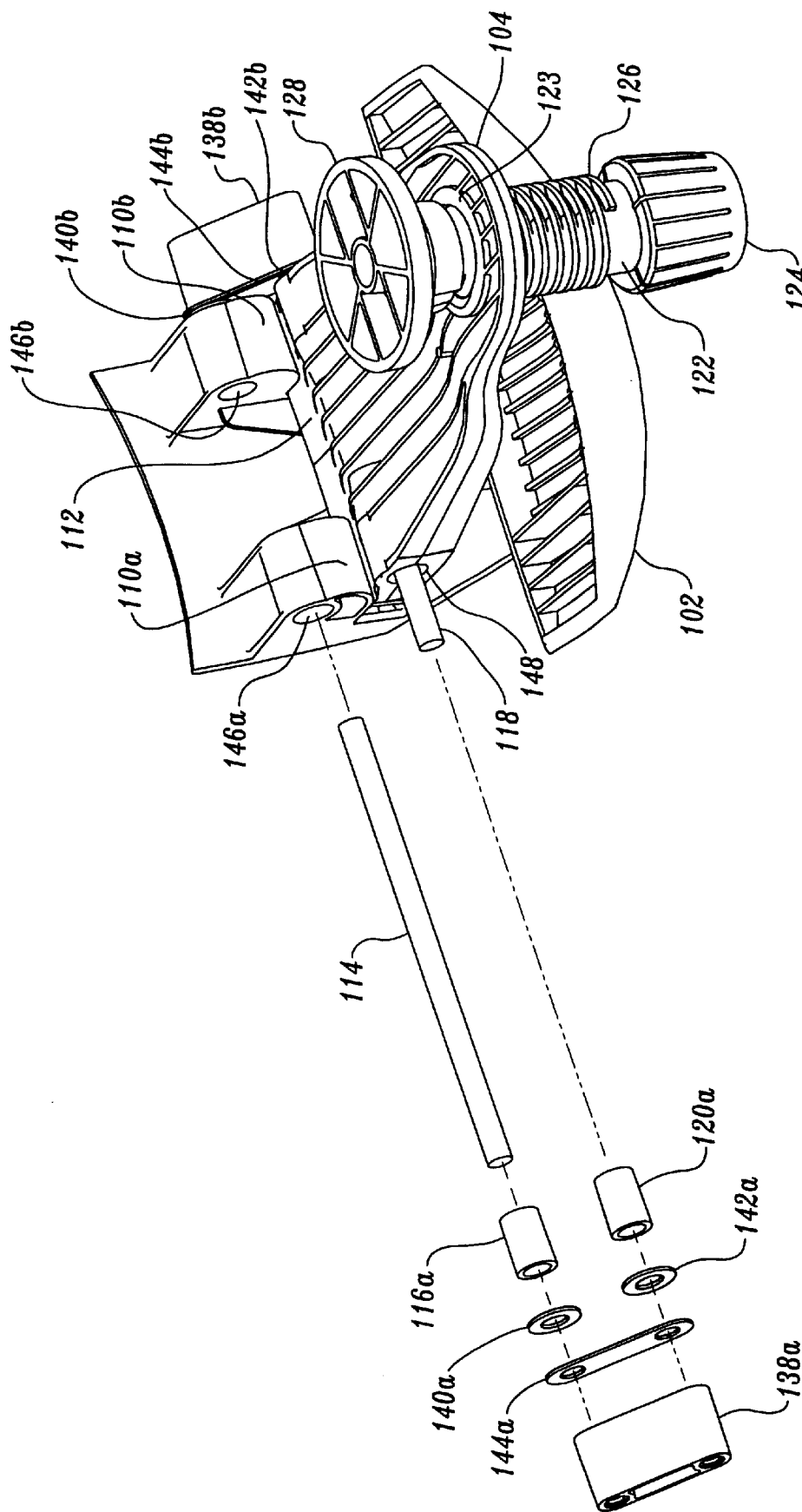
FIG. 5 is an exploded isometric view of the clamp, showing a pair of pivot rods.

FIG. 5 illustrates further details of the pivot assemblies for handle 102 and lever 104. Cams 110*a* and 110*b* in handle 102 are disposed below orifices 146*a* and 146*b* that are formed on opposite sides of the handle. The ends of rod 114 are supported in orifices 146*a* and 146*b* of the handle by bearings 116*a* and 116*b* (bearing 116*b* is not displayed). Bearings 116*a* and 116*b* comprise bushings that reduce the friction relative to rod 114 as handle 102 is pivoted between its open and closed positions.

Similarly, rod 118 is disposed in an orifice 148 formed across the width of lever 104, adjacent one end of the lever. A pair of bearings 120*a* and 120*b* (bearing 120*b* is not displayed) are disposed at each end of orifice 148, and rod 118 passes through the bearings. Lever 104 thus rotates about rod 118, between the closed and the open positions of the clamp. Since cams 110*a* and 110*b* ride over surface 112, the disposition (open/closed position) of handle 102 causes lever 104 to pivot around rod 118 to a corresponding position. Bearings 120*a* and 120*b* reduce the friction at each end of rod 118 when lever 104 is rotating between positions that correspond to the open and closed positions of the handle.

Connector 138*a* couples an end of rod 114 that extends beyond orifice 146*a* to an end of rod 118 that extends beyond orifice 148. Similarly, connector 138*b* couples the other end of rod 114 that extends beyond orifice 146*b* to the other end of rod 118 that extends beyond the other side of orifice 148. It is important to note that although not shown in this Figure, connectors 138*a* and 138*b* are joined to housing member 106 (see FIG. 1), and thus support the clamp relative to the housing member. Washers 140*a* and 140*b* are disposed at each end of rod 114, and washers 142*a* and 142*b* are disposed at each end of rod 118. Washers 140*a*, 140*b*, 142*a*, and 142*b* are employed to reduce friction when handle 102 and lever 104 are moving, relative to connectors 138*a* and 138*b*. Also, a metal strap 144*a* is connected in parallel with connector 138*a* between rod 114 and rod 118, and a metal strap 144*b* is connected in parallel with connector 138*b* between rod 114 and rod 118. Straps 144*a* and 144*b* absorb and offset forces produced at the ends of rods 114 and 118 by the movement of handle 102 between the open and the closed positions and the corresponding positions of lever 104, so that these forces need not be sustained by connectors 138*a* and 138*b*. To further reduce costs, an yet more preferable embodiment will eliminate these straps, washers, and separate bushings and will incorporate the bushings into the connectors on each side of the clamp assembly as an integral part of the connector plastic molding. The necessary strength will be provided by the connector without the need for the metal straps.

Figure 4:
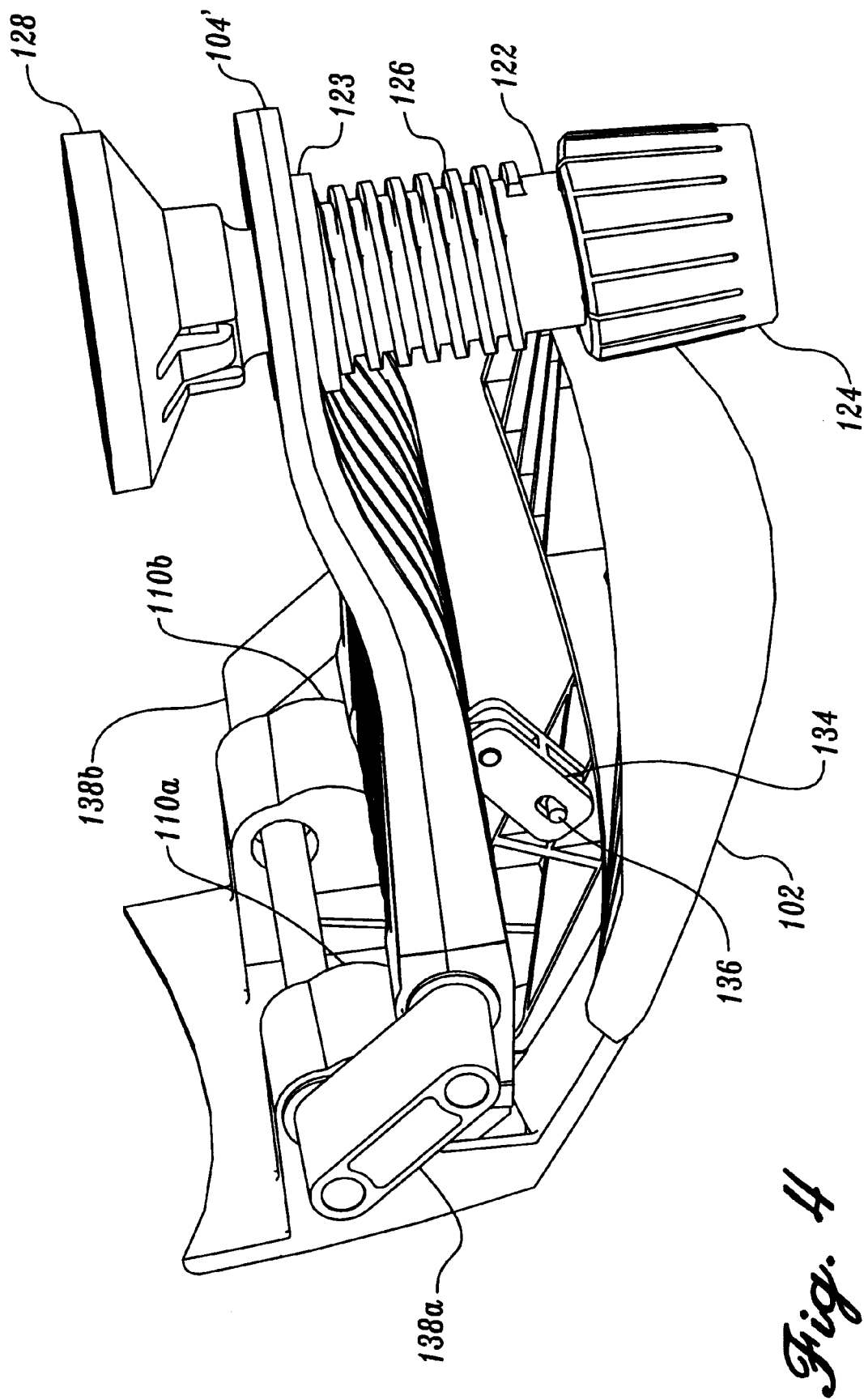
FIG. 4 is an isometric view showing another preferred embodiment of the clamp in a closed position.

It should be noted that in the embodiment discussed above, the force of gravity generally causes lever 104 to move away from the underside of the work surface as handle 102 is pivoted to the open position. In FIG. 4, another preferred embodiment of the present invention is illustrated that includes means for positively moving a lever 104' downwardly as handle 102 is pivoted to the open position. This Figure shows the clamp in the closed position. In this embodiment of the clamp, one end of a link 134 is connected to lever 104' and another end of the link is loosely coupled by a pin 136 to handle 102. Although the work surface is not shown, it will be apparent that link 134 biases lever 104' away from the work surface when handle 102 is moved downwardly to the open position. In all other respects, this embodiment is identical to the first embodiment discussed above.

Figure 6:
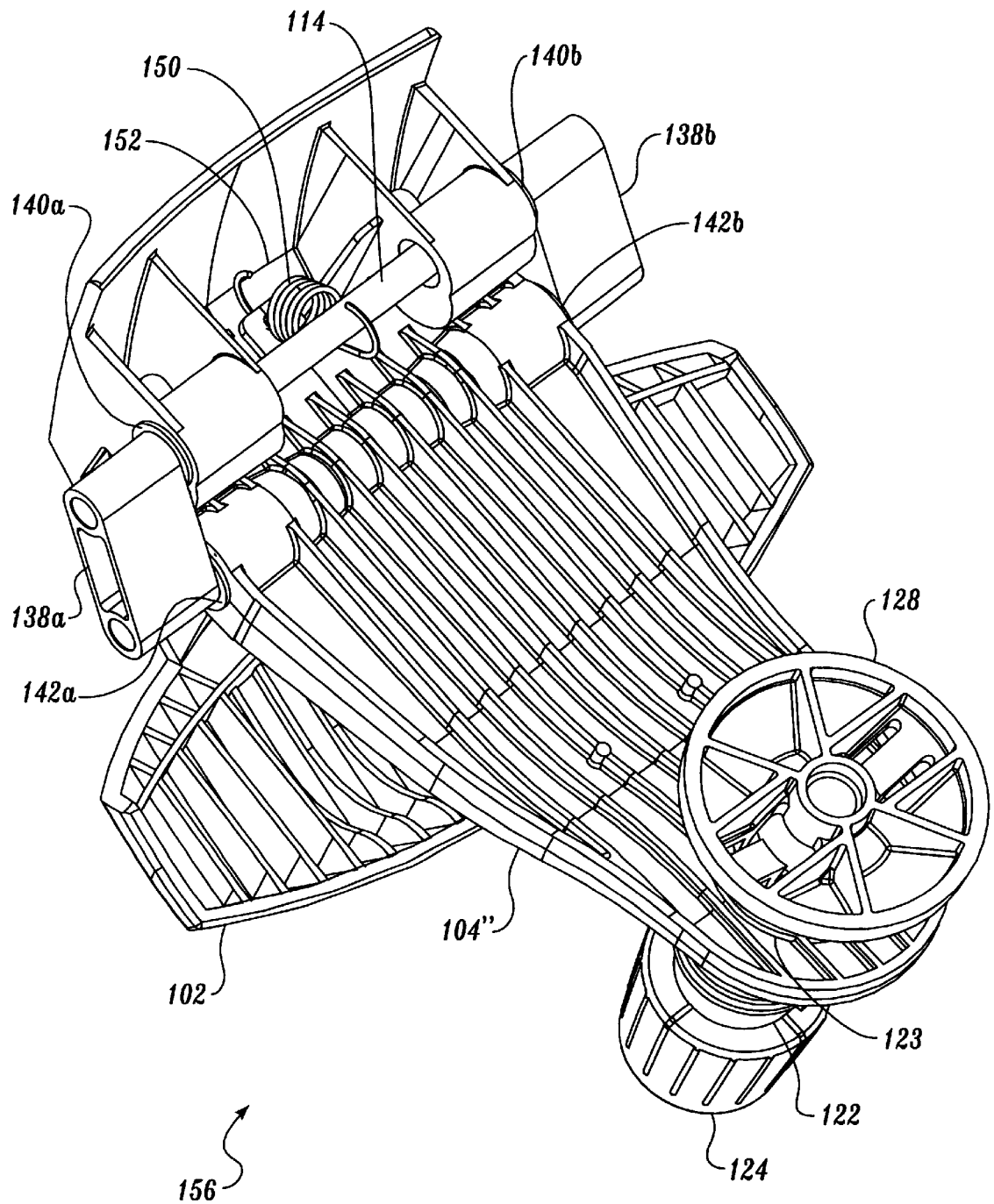
FIG. 6 is top isometric view of another preferred embodiment of the present invention that employs a helical spring to bias the lever toward an open position.

FIG. 6 shows a clamp 156 that is another preferred embodiment of the present invention. In clamp 156, a helical spring 150 extends between rod 114 and a tab 152 that is formed at the center of an end of a lever 104". When handle 102 is rotated to its open position, spring 150 applies a force to lever 104" that biases it, causing the lever to pivot about rod 118 away from the work surface.

Figure 7:
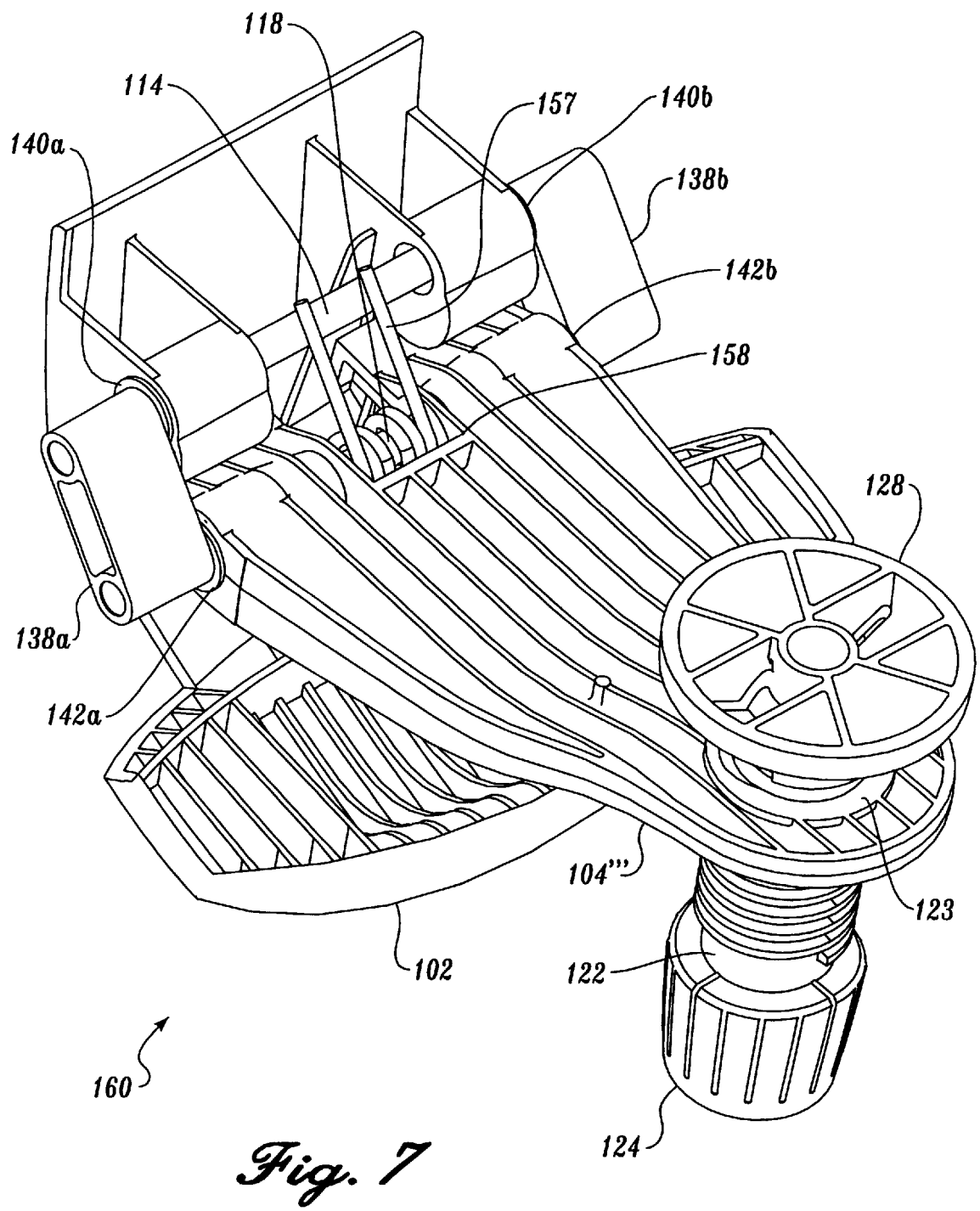
FIG. 7 is an isometric top view of another preferred embodiment that employs a torsion spring to bias the lever to the open position.
Figure 9:
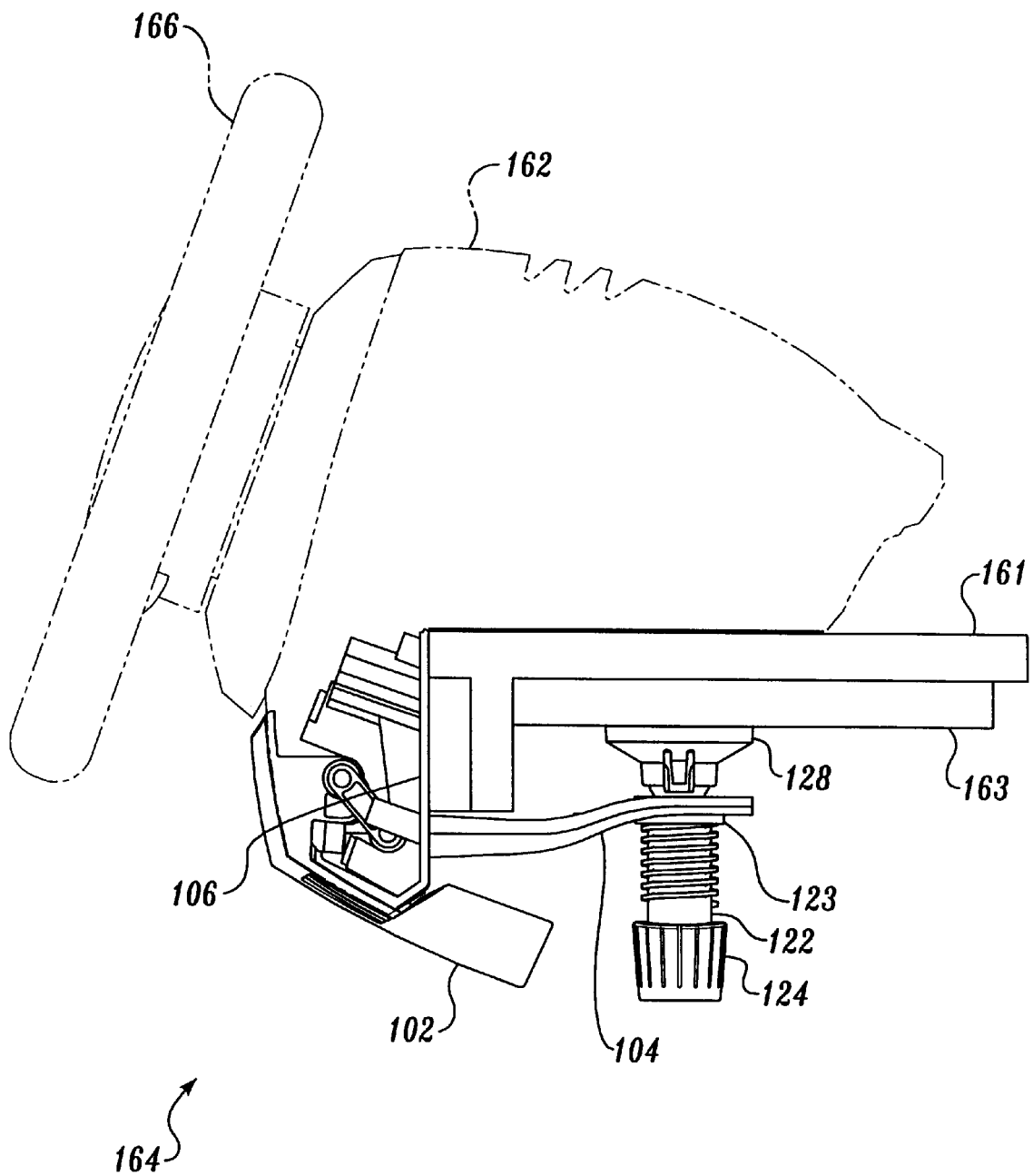
FIG. 9 is a side elevational view of the clamp, illustrating how it is used for attaching a game input steering wheel housing (phantom view) to a work surface.
Figure 10:
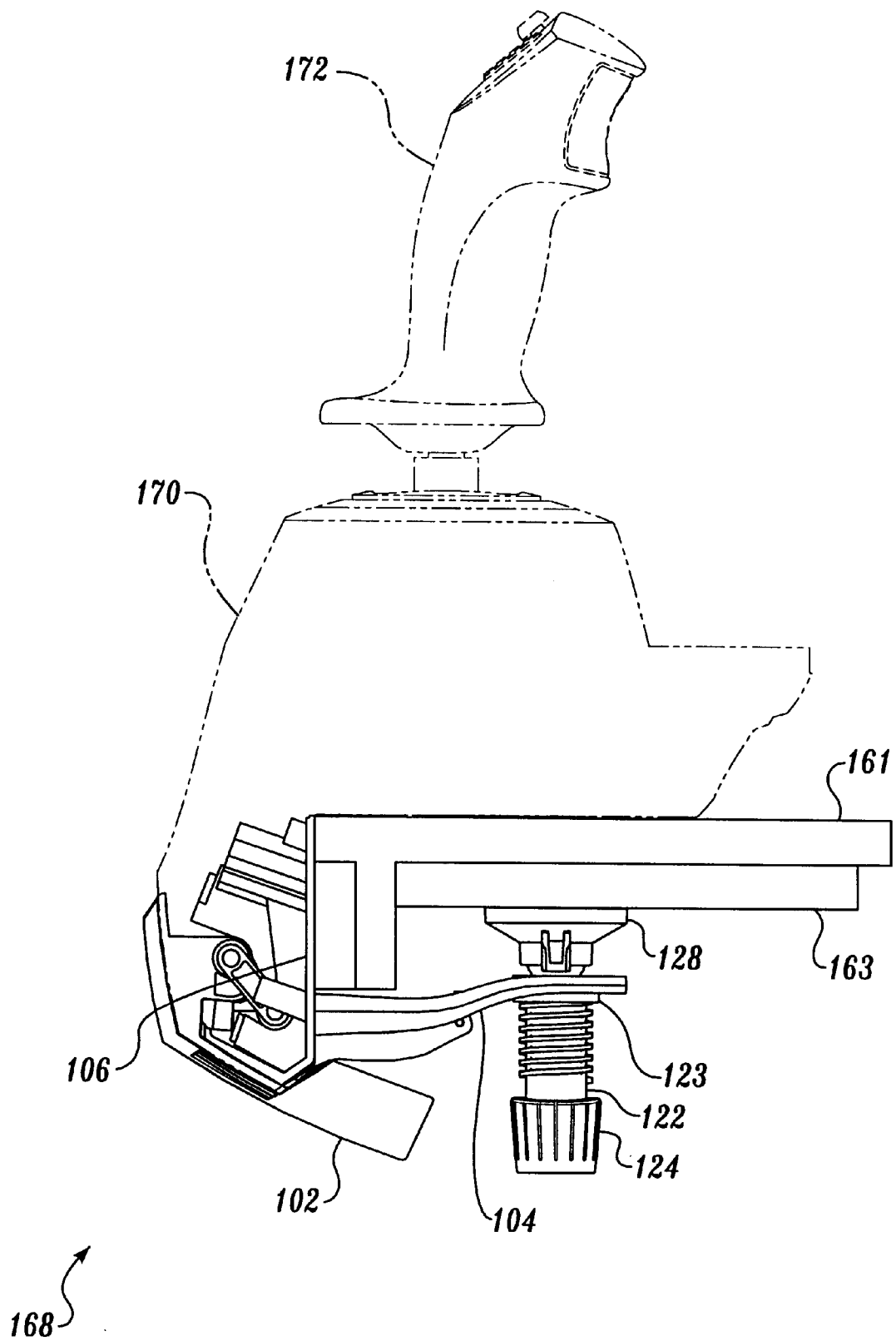
FIG. 10 is a side elevational view of the clamp, illustrating how it is used for attaching a joystick housing to a work surface.

In FIG. 7, a clamp 160 is shown that represents an alternative to clamp 156. A coiled torsion spring 151 is disposed in a slot 158 that is formed in an end of a lever 104'''. Rod 118 passes through a center of spring 151. One end of spring 151 contacts rod 114 and the other end (not shown) of the spring contacts the end of lever 104'''. Spring 151 thus provides a force that biases lever 104''' away from a work surface when handle 102 is in the open position. Both clamps 156 and 160 are otherwise generally identical to clamp 100, except for the biasing force that urges the lever away from the work surface.

FIGS. 8*a*, 8*b*, 8*c*, and 8*d* illustrate a transition of any of the embodiments of the clamp from a closed position 159 (FIG. 8*a*) to an open position 165 (FIG. 8*d*). In these Figures, housing member 106 is shown with a dash line. As noted above, cams 110*a* and 110*b* have a profile that varies the distance to the center of rod 114 as the cams are rotated. The pivoting of handle 102 about rod 114 causes cams 110*a* and 110*b* to rotate and apply a force to lever 104 at surface 112. The applied force rotates the end of lever 104 about the axis defined by rod 118, so that the other end of the lever pivots and moves shoe 128 relative to an underside 163 of the work surface. In FIG. 8*a*, handle 102 is shown in closed position 159 with handle 102 and lever 104 disposed in a substantially horizontal position and shoe 128 positioned against underside 163 of a work surface 161. Stop 155 limits the counter clockwise pivoting of handle 102 in closed position 159. FIG. 8*b* illustrates the beginning of the transition from the closed position to the open position. Handle 102 is disposed in a substantially inclined position (approximately 60 degrees below horizontal), and shoe 128 has started to move away from underside 163 of the work surface. FIG. 8*c* displays a further transition from the closed position to the open position. Handle 102 is nearly vertical and lever 104 is approximately 10 degrees below horizontal, moving shoe 128 further away from underside 163. FIG. 8*d* shows the clamp in open position 165, in which handle 102 is inclined approximately 20 degrees beyond vertical, and lever 104 is approximately 30 degrees below horizontal, positioning shoe 128 completely away from underside 163. Stop 151 limits the clockwise pivoting of handle 102 in open position 165.

FIGS. 9, 10, 11, and 12 respectively illustrate clamps 164, 168, 174, and 180 in accord with the present invention (i.e., using any of the embodiments disclosed above) for mounting various devices to work surface 161. In each of the Figures, the device is shown in dash lines to indicate that it is not part of the clamp. Thus, clamp 164 (FIG. 9) is employed for mounting a game input steering wheel 166 having a housing 162, which is coupled to housing member 106. Clamp 168 (FIG. 10) is employed for mounting a joystick 172 having a housing 170, which is coupled to housing member 106. Similarly, clamp 180 (FIG. 12) is used for mounting a yoke 184 and a housing 182 to work surface 161. In this case, housing 182 is coupled to housing member 106. Finally, clamp 174 (FIG. 11) is used for mounting a lamp fixture 178 having a housing 176, which is coupled to housing member 106. In each of these Figures, the clamps are closed, lever 104 is shown substantially horizontal, and bolt 122 is adjusted so that shoe 128 is firmly pressed against underside 163. The user is able to vigorously use steering wheel 166, joystick 172, and yoke 184 without concern that it will move about, because the housing of these devices is in each instance, securely clamped to work surface 161 by the clamps.

Figure 11:
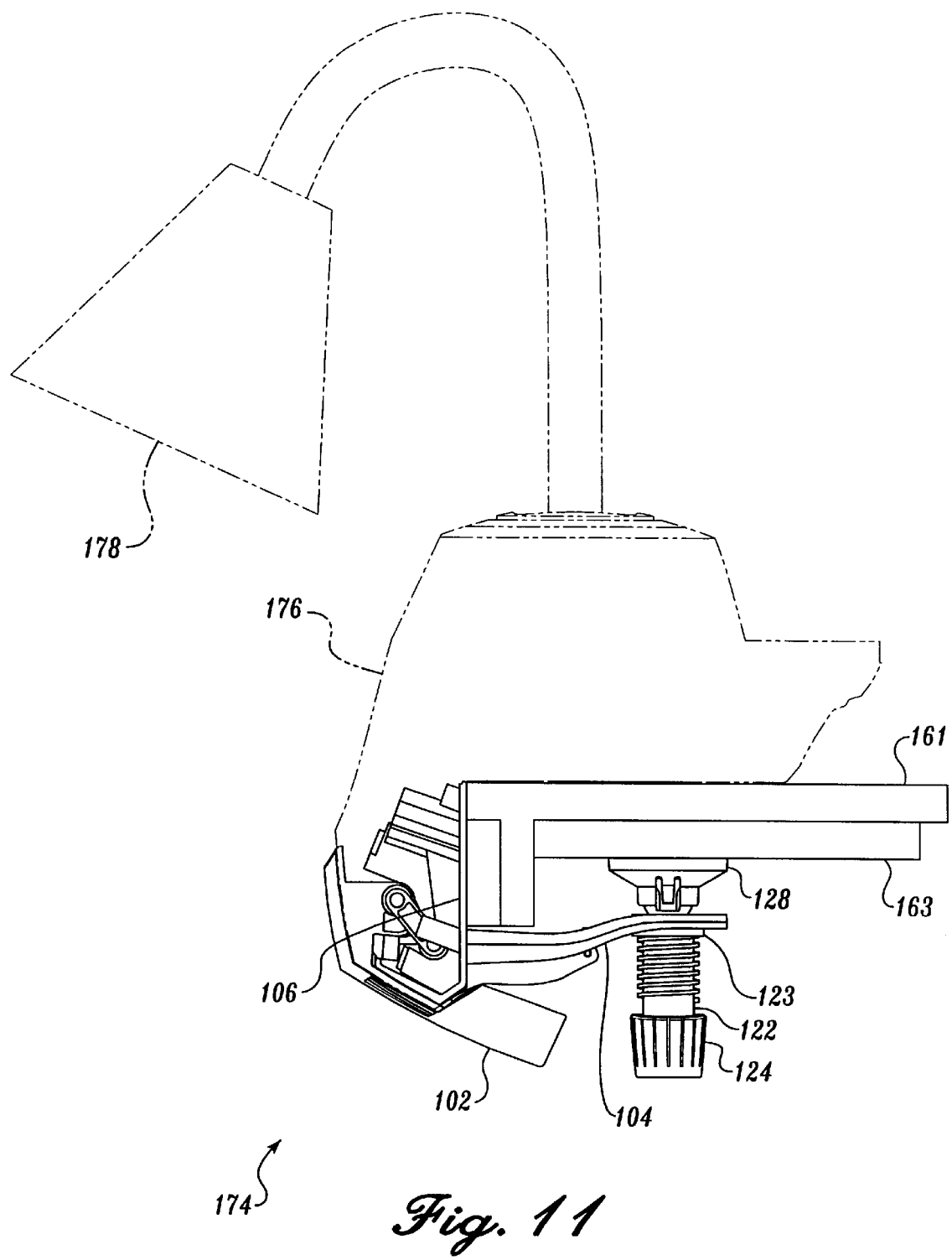
FIG. 11 is a side elevational view of the clamp, illustrating how it is used for attaching a lamp housing to a work surface.
Figure 12:
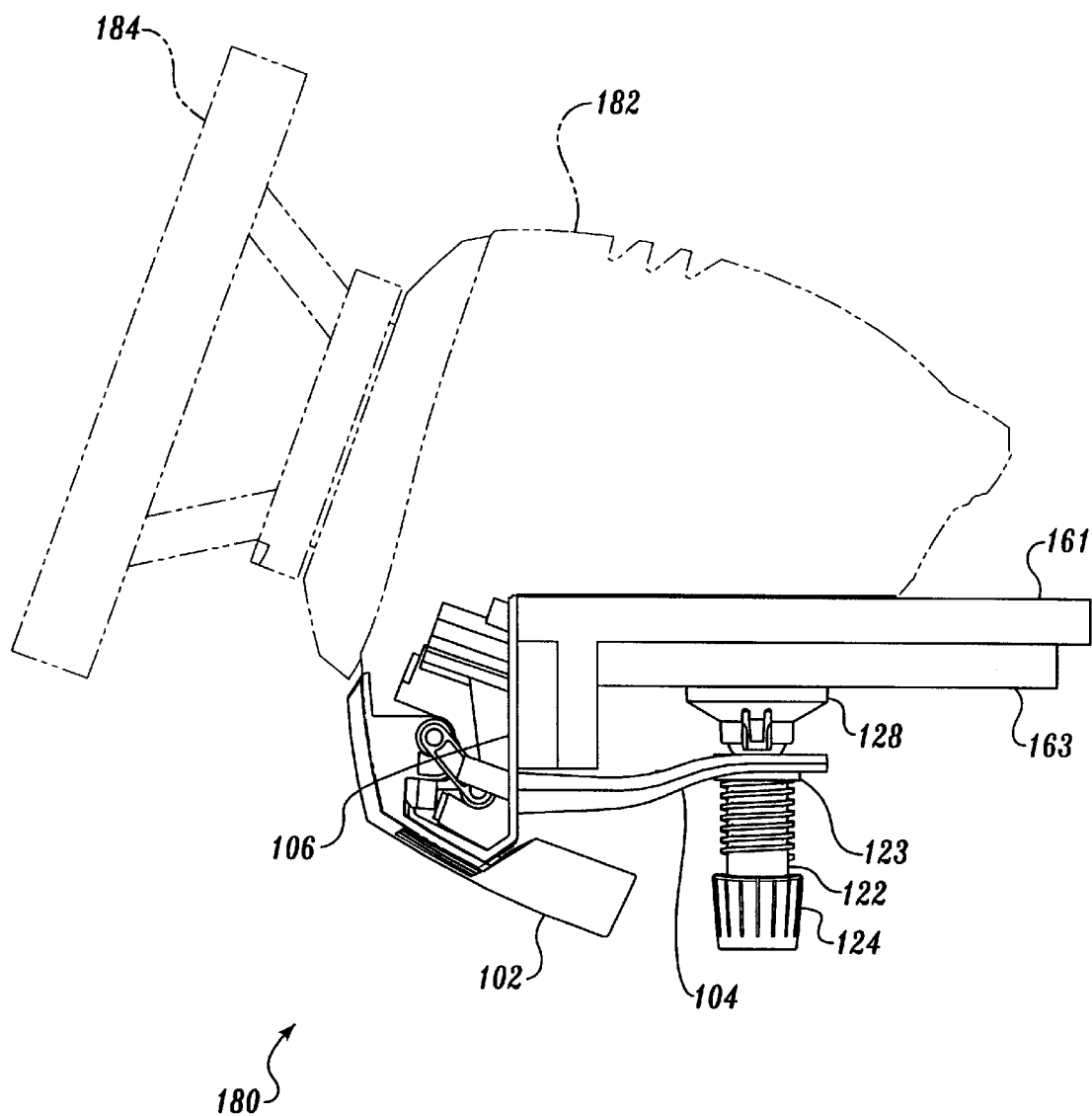
FIG. 12 is a side elevational view of the clamp, illustrating how it is used for attaching a yoke housing to a work surface.

As will be evident from FIG. 11, the user is able to readily reposition lamp fixture 178 with minimal effort, because a simple movement of handle 102 between its open and closed position is all that is required to engage/disengage the clamp, once bolt 122 is initially adjusted to accommodate the thickness of the work surface. It is envisioned that the present invention may also be used to mount other types of devices to a work surface, e.g., a computer monitor, a microphone, a telephone, a fan, a speaker, etc.

Figure 13:
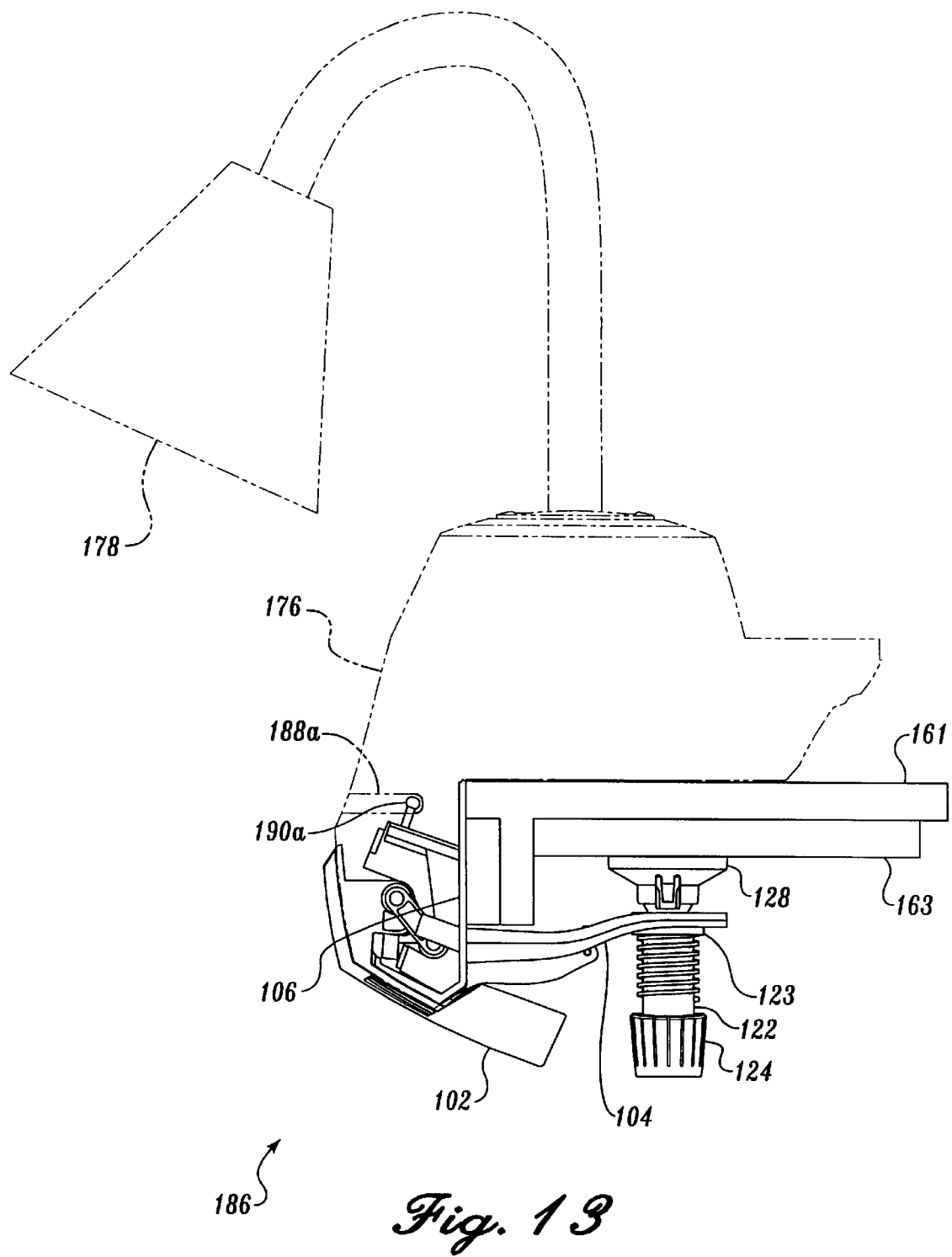
FIG. 13 is a side elevational view of another preferred embodiment that is removably connected to a lamp housing.

FIG. 13 illustrates a clamp 186 in accord with the present invention (i.e., generally including the elements of any of the embodiments disclosed above). Clamp 186 is removably connected to housing 176. A pin 190a is connected to housing member 106 and is secured in a slot 188a that is formed in housing 176. Although not shown here, another pin 190b is connected to the opposite side of housing member 106 and is secured in another slot 188b formed in the opposite side of housing 176. The respective positioning of pins 190a and 190b in slots 188a and 188b creates a removable connection between housing 176 and housing member 106. This arrangement would enable the same clamp to be used for mounting two or more devices to a work surface, since each device is readily attached to or detached from housing member 106 as a result of the pin and slot arrangement described above, and thus quickly secured to the same work surface by clamp 186, without any need to readjust bolt 122.

Figure 14A:
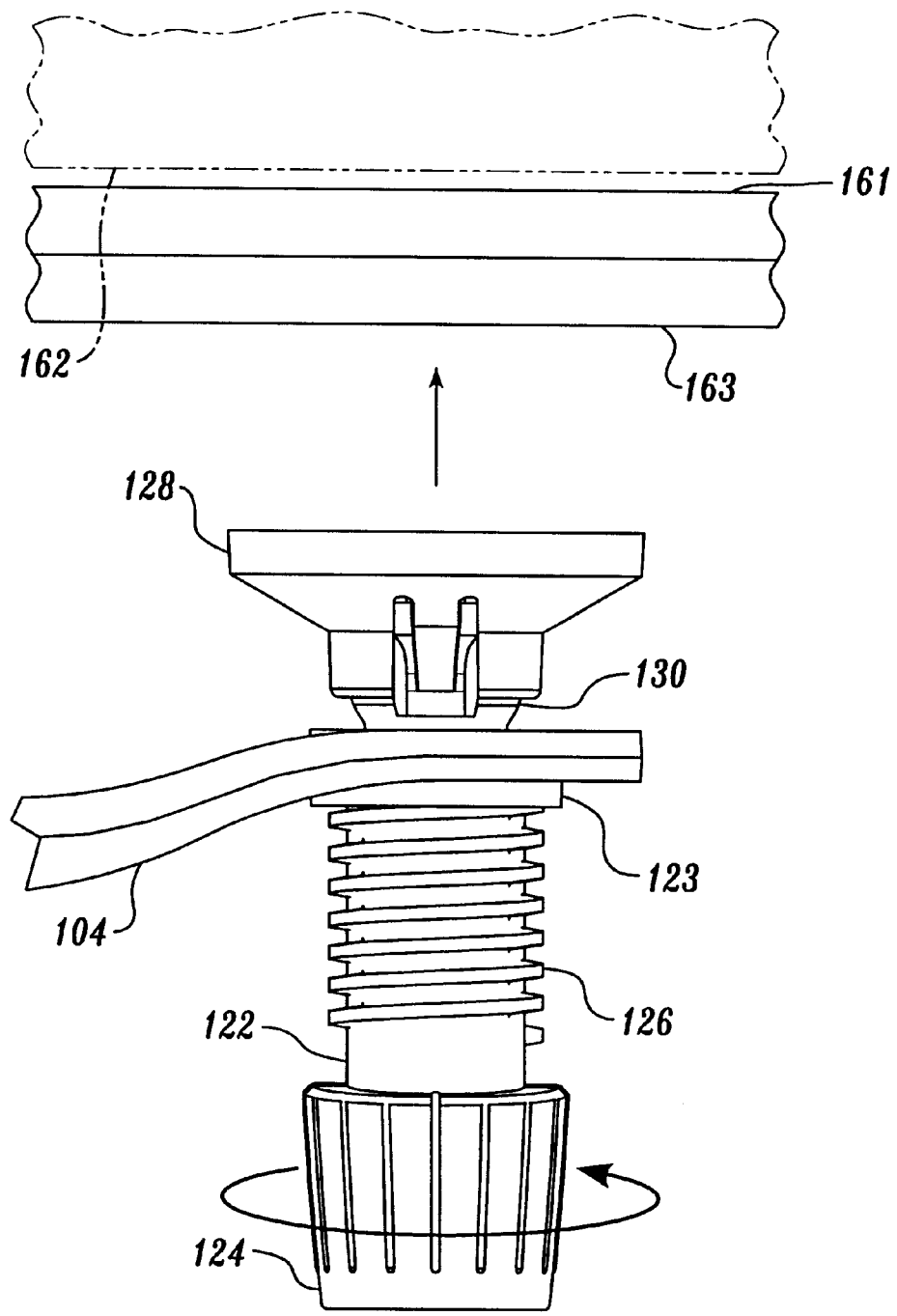
FIG. 14a is a side elevational view illustrating how the clamp is adjusted to decrease the distance between the underside of the work surface and a shoe of the clamp.
Figure 14B:
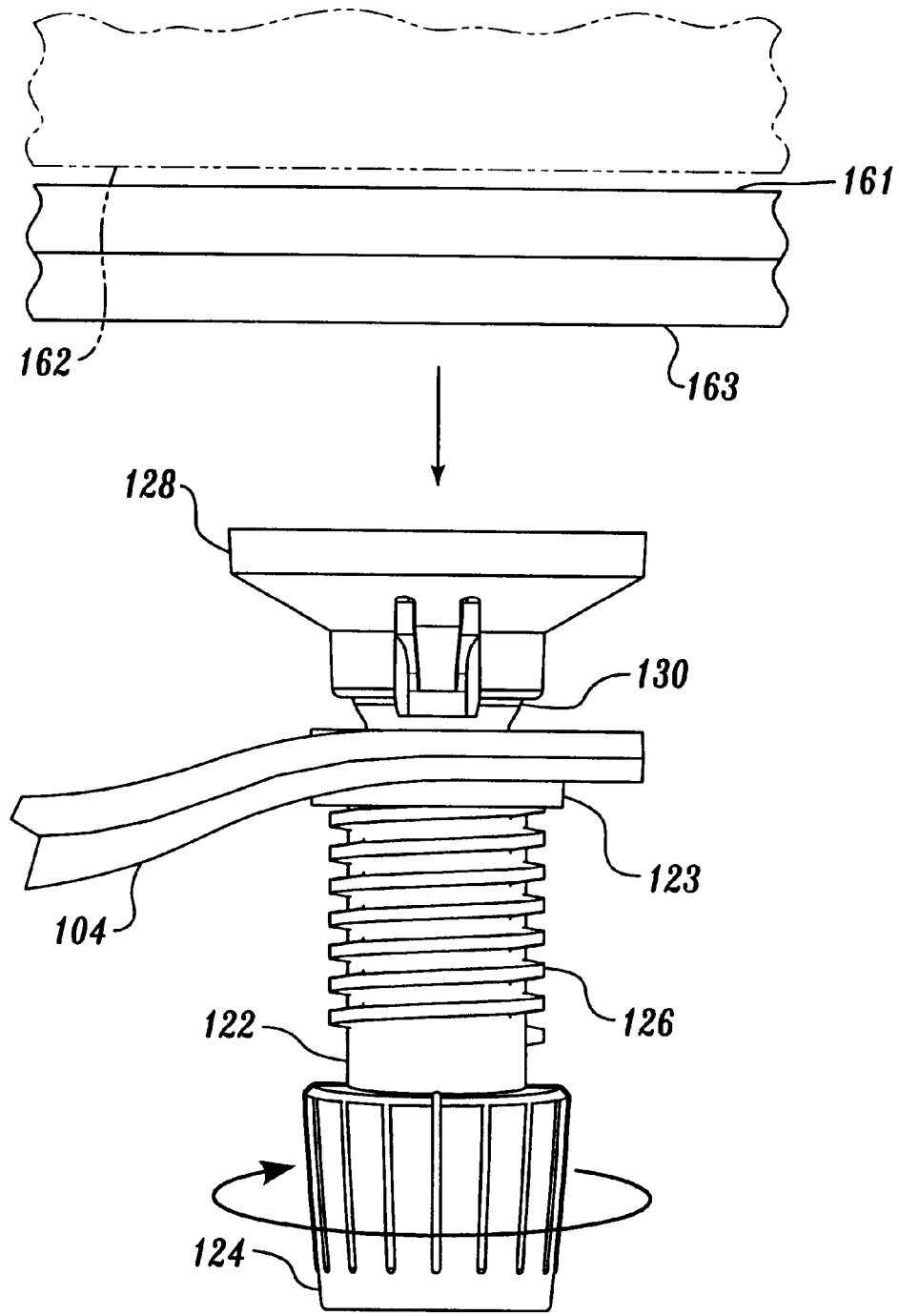
FIG. 14b is a side elevational view illustrating how the clamp is adjusted to increase the distance between the underside of the work surface and the shoe.

FIGS. 14a and 14b illustrate adjustment of bolt 122. In FIG. 14a, as bolt 122 is turned clockwise in socket 123, shoe 128 is moved towards underside 163 by an amount determined by the pitch of threads 126. In FIG. 14b, as bolt 122 is turned counter-clockwise in socket 123, shoe 128 is moved away from underside 163. FIGS. 14a and 14b thus illustrate how shoe 128 is adjusted to accommodate different thicknesses of work surfaces.

Preferably, bearings 116a, 116b, 120a, and 120b comprise a non-metallic material selected for its low friction characteristics, such as acetal (DELRIN) and TEFLON plastic. Also, lever 104 preferably is fabricated of a relatively stiff material that also has a characteristic elasticity, e.g., acetal plastic. The elasticity of lever 104 is determined to prevent damage to the clamp when the user has adjusted the position of shoe 128 for a work surface thickness that is substantially less than the actual thickness of the work surface to which the clamp is mounted. In this case, damage to the clamp is avoided by the flexing of lever 104, which compensates for the incorrect adjustment of the bolt.

The present invention thus enables clamping or unclamping a device to a work surface with a single movement (one touch). When using the clamp, initially, the user positions the device being clamped near an edge of a work surface. For each different work surface with which the clamp is used, the user performs a one-time setup to adjust the clamp to the thickness of the work surface by rotating bolt 122 so that shoe 128 is in a position that accommodates the thickness of that work surface. Next, the user rotates handle 102 approximately 90 degrees from a substantially vertical position (or past vertical disposition) to a substantially horizontal position. The movement of handle 102 in this manner forces the lever and shoe against the work surface, firmly attaching the device to the work surface. The device is removed from the work surface when the user rotates the handle through approximately 90 degrees, from the substantially horizontal position to the substantially vertical position. It is important to note that once the initial set up for the thickness of the work surface is performed, the device may be repeatedly removed and attached to the same work surface with a single movement (90 degrees rotation) of the handle. It should also be noted that the clamp can be disposed on the top of the work surface to attach a device to the bottom of the work surface.

Although the present invention has been described in connection with several preferred embodiments, those of ordinary skill in the art will understand that many other modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. Apparatus for clamping a device to a work surface, at an edge of the work surface, the apparatus being disposed generally at the edge and adjacent one side of the work surface, and the device being disposed generally at the edge and in contact with an opposite side of the work surface, comprising:

(a) a member that is attached to the device;

(b) an elongate handle having two opposite ends, a cam being disposed adjacent to one end of the handle, the other end of the handle comprising a grip, said handle being pivotally coupled to the member;

(c) an elongate lever having two opposed ends, a surface disposed adjacent one end of the lever riding on the cam of the handle, a socket being disposed at the other end of the lever, said lever being pivotally coupled to the member, rotation of the handle by a user causing the cam to apply a force on the surface of the lever that produces a corresponding rotation of the lever;

(d) a bolt disposed in the socket and adjustable relative to the lever to accommodate a thickness of the work surface; and (e) a shoe coupled to an end of the bolt, said shoe applying a compressive force against said one side of the work surface, relative to the device in contact with the opposite side of the work surface, as the handle is pivoted to a closed position, said shoe moving away from said one side of the work surface as the handle is pivoted to an open position, the closed position of the handle causing the device to be clamped to the work surface and the open position enabling the device to be removed from the work surface.

2. The apparatus of claim 1, wherein the bolt is threaded and the socket has a corresponding mating thread, a disposition of the bolt within the socket being adjusted to accommodate the thickness of the work surface by rotating the bolt within the socket.

3. The apparatus of claim 1, wherein the bolt extends through the socket in a direction that is generally tilted when the device is not clamped to the work surface, and is generally perpendicular to the work surface when the device is clamped to the work surface due to a deflection of the lever that occurs as the handle is pivoted to the closed position so that the lever applies force through the shoe against said one side of the work surface.

4. The apparatus of claim 1, wherein the bolt has another end opposite the end coupled to the socket, said other end including a knob having a surface that is adapted for gripping by the user.

5. The apparatus of claim 1, wherein the end of the bolt has a generally spherical shape that clips within a correspondingly sized and shaped cavity formed within the shoe, the spherical shape enabling the shoe to universally rotate relative to the end of the bolt so that the shoe is able to seat against said one side of the work surface even when said one side is substantially non-parallel to said opposite side of the work surface.

6. The apparatus of claim 1, wherein the lever is fabricated of a material having a characteristic flexibility that enables the lever to flex without breakage when the bolt has not been correctly adjusted to the thickness of the work surface.

7. The apparatus of claim 1, wherein a width of the end of the lever is broader than a width of the other end of the lever to disperse force where the lever is pivotally mounted to the member.

8. The apparatus of claim 1, wherein the handle further includes another cam, the cams being disposed near opposing edges on the same side of the handle, the other cam riding on the surface of the lever as the handle is moved by the user.

9. The apparatus of claim 1, wherein the cam is disposed above the end of the lever.

10. The apparatus of claim 1, wherein the cam is disposed below the end of the lever.

11. The apparatus of claim 1, wherein the handle is pivotally mounted to the member by a first rod, and the lever is pivotally mounted to the member by a second rod.

12. The apparatus of claim 11, further comprising a strap that extends between the first rod and the second rod to sustain forces between the rods arising as the handle and lever move, so that said forces are generally not experienced by the member.

13. The apparatus of claim 11, further comprising bearings disposed about the first and second rods to reduce friction between the handle and the first rod and between the lever and the second rod as the handle and the lever pivot about the first and second rods, respectively.

14. The apparatus of claim 13, wherein the bearings are formed of a non-metallic material.

15. The apparatus of claim 13, wherein the bearings comprise bushings.

16. The apparatus of claim 1, further comprising a stop that limits a travel of the handle in at least one of the closed position and the open position.

17. The apparatus of claim 1, wherein the member is integral to the device.

18. The apparatus of claim 1, further comprising a fastener to removably attach the device to the member.

19. The apparatus of claim 18, wherein the fastener comprises a slot formed in one of the member and the device, and a pin coupled to the other of the member and the device and positioned to engage the slot, the device being removably attached to the member by engaging the pin in the slot.

20. The apparatus of claim 1, further comprising a torsion spring that applies a force to the lever causing said other end of the lever to be moved away from said one side of the work surface as the handle is moved to the open position.

21. The apparatus of claim 1, further comprising a helical spring coupled between the member and the lever, the helical spring applying a force to the lever that causes said other end of the lever to be moved away from said one side of the work surface as the handle is moved to the open position.

22. The apparatus of claim 1, further comprising a link loosely connecting the handle to the lever, the link causing said other end of the lever to be moved away from said one side of the work surface as the handle is moved to the open position.

23. The apparatus of claim 1, wherein the open position is defined by the handle being generally vertically oriented, and the closed position is defined by the handle being generally horizontally oriented.

24. The apparatus of claim 1, wherein the device comprises one of a joystick, a steering wheel, a yoke, a lamp, a computer monitor, a microphone, a telephone, a fan, and an audio speaker.

25. The apparatus of claim 1, wherein the grip has a shape that is contoured and adapted to be grasped by a hand of the user.

26. Apparatus for clamping a device to a work surface by applying a compressive force to one side of the work surface opposite that on which the device is disposed, comprising:

(a) a handle pivotally mounted on a first pivot that is supported by a member, said member being adapted to couple to the device, the first pivot being disposed at one end of said handle adjacent to a cam formed on said one of the handle, an opposite end of the handle having a grip adapted to be grasped by a user, said cam having a profile providing a varying distance between a center of the first pivot rod and a cam surface; and (b) a lever pivotally mounted on a second pivot that is supported by the member, the cam surface of the handle riding against one end of the lever, an opposite end of the lever applying a force against said one side of the work surface in response to rotation of the handle about the first pivot by a user in one direction, rotation of the handle in said one direction rotating the cam so as to increase a force acting on said one end of the lever, causing the lever to rotate about the second pivot rod to a closed position in which the device is clamped to the work surface, rotation of the handle about the first pivot rod in an opposite direction to an open position enabling the device to be removed from the work surface.

* * * * *